(12) United States Patent
Tanaka et al.

(10) Patent No.: US 11,353,728 B2
(45) Date of Patent: Jun. 7, 2022

(54) OPTICAL MODULATOR

(71) Applicant: SUMITOMO ELECTRIC INDUSTRIES, LTD., Osaka (JP)

(72) Inventors: Hajime Tanaka, Osaka (JP); Tsutomu Ishikawa, Osaka (JP); Masataka Watanabe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 72 days.

(21) Appl. No.: 16/992,764

(22) Filed: Aug. 13, 2020

(65) Prior Publication Data

US 2021/0055622 A1 Feb. 25, 2021

(30) Foreign Application Priority Data

Aug. 23, 2019 (JP) .............................. JP2019-152709

(51) Int. Cl.
*G02F 1/025* (2006.01)
*G02F 1/03* (2006.01)
*G02F 1/015* (2006.01)
*G02F 1/225* (2006.01)

(52) U.S. Cl.
CPC .............. *G02F 1/025* (2013.01); *G02F 1/015* (2013.01); *G02F 1/0316* (2013.01); *G02F 1/2255* (2013.01)

(58) Field of Classification Search
CPC ...... G02F 1/025; G02F 1/2255; G02F 1/0316; G02F 2201/127; G02F 1/015

USPC ......................................................... 385/1–3
See application file for complete search history.

(56) References Cited

U.S. PATENT DOCUMENTS

2016/0011439 A1\* 1/2016 Kitamura ................ G02F 1/218
385/2

OTHER PUBLICATIONS

Yuda, M., et al., "Degradation mode in semiconductor optical modulators," Electronic Letters, Sep. 28, 1995, vol. 31, No. 20, pp. 1178-1779.
Mawatari, H., et al., "Clarification of the degradation modes of an InP-based semiconductor MZ modulator," Proc. 2012 IEEE International Reliability Physics Symposium, Apr. 2012, Anaheim, CA, pp. CD.7.1-CD.7.5.

\* cited by examiner

*Primary Examiner* — Michael P Mooney
(74) *Attorney, Agent, or Firm* — Volpe Koenig

(57) ABSTRACT

An optical modulator includes a waveguide formed of a semiconductor and configured to allow light to propagate therethrough; a first electrode disposed on the waveguide and electrically connected to the waveguide; and a second electrode separated from the waveguide and electrically connected to the waveguide. An edge of the second electrode on a light entry side is located downstream of an edge of the first electrode on the light entry side in a propagation direction of the light.

14 Claims, 3 Drawing Sheets

OPTICAL MODULATOR

CROSS REFERENCES TO RELATED APPLICATIONS

The present disclosure contains subject matter related to Japanese Patent Application No. 2019-152709 filed in the Japan Patent Office on Aug. 23, 2019, the entire contents of which are incorporated herein by reference.

BACKGROUND OF THE INVENTION

1. Field of the Invention

The present disclosure relates to optical modulators.

2. Description of the Related Art

Optical modulators formed of semiconductor layers and configured to modulate light have been developed, as discussed in the non-patent literature M. Yuda, M. Fukuda and H. Miyazawa, Degradation mode in semiconductor optical modulators, ELECTRONICS LETTERS, 1995, September 28th, Vol. 31, No. 20, pp. 1778-1779.

SUMMARY OF THE INVENTION

An optical modulator is operated by allowing light to enter the optical modulator and applying a voltage between electrodes. A semiconductor layer of the optical modulator absorbs light to generate a current. Such an optical absorption current may destroy the optical modulator. Accordingly, there is a need for an optical modulator in which destruction can be inhibited.

An optical modulator according to one aspect of the present disclosure includes a waveguide formed of a semiconductor and configured to allow light to propagate therethrough; a first electrode disposed on the waveguide and electrically connected to the waveguide; and a second electrode separated from the waveguide and electrically connected to the waveguide. An edge of the second electrode on a light entry side is located downstream of an edge of the first electrode on the light entry side in a propagation direction of the light.

DESCRIPTION OF THE PREFERRED EMBODIMENTS

Description of Embodiments of the Disclosure

First, embodiments of the present disclosure will be listed and described.

(1) One embodiment of the present disclosure is an optical modulator including a waveguide formed of a semiconductor and configured to allow light to propagate therethrough; a first electrode disposed on the waveguide and electrically connected to the waveguide; and a second electrode separated from the waveguide and electrically connected to the waveguide. An edge of the second electrode on a light entry side is located downstream of an edge of the first electrode on the light entry side in a propagation direction of the light. A voltage drop occurs before a current generated from the waveguide by the entry of light reaches the second electrode. Thus, the voltage applied to the edge of the first electrode decreases, and the destruction of the waveguide can be inhibited.

(2) The waveguide may include a first semiconductor layer of a first conductivity type, a core layer disposed on the first semiconductor layer, and a second semiconductor layer of a second conductivity type disposed on the core layer. The first semiconductor layer may extend outside the waveguide. The first electrode may be electrically connected to the second semiconductor layer. The second electrode may be disposed on the first semiconductor layer and may be electrically connected to the first semiconductor layer. The destruction of the p-n junction of the waveguide can be inhibited.

(3) The first semiconductor layer and the second semiconductor layer may include indium phosphide, and the core layer may include aluminum gallium indium arsenide. The destruction of the p-n junction of the waveguide can be inhibited.

(4) The distance from the edge of the first electrode to the edge of the second electrode in the propagation direction of the light may be 350 μm or more. The destruction of the waveguide can be effectively inhibited.

(5) The first electrode and the second electrode may extend in the propagation direction of the light, and the second electrode may have a length of 200 μm or more in the propagation direction of the light. The concentration of an electric field at the second electrode can be alleviated, thus inhibiting destruction.

Details of Embodiments of the Disclosure

Specific examples of optical modulators according to embodiments of the present disclosure will hereinafter be described with reference to the drawings. It should be understood, however, that the disclosure is not limited to these examples, but is indicated by the claims, and all changes that come within the meaning and range of equivalency of the claims are intended to be embraced therein.

First Embodiment

Optical Modulator

Figure 1A:
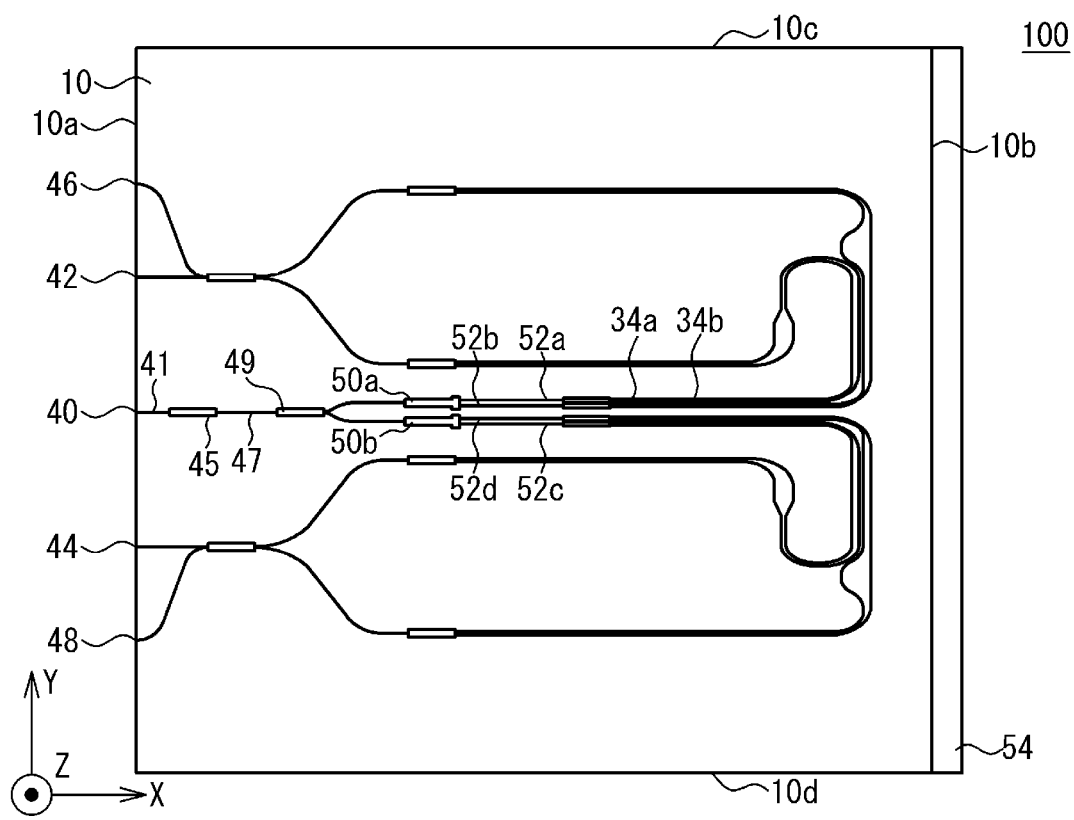
FIG. 1A is a plan view illustrating an example optical modulator according to a first embodiment.

FIG. 1A is a plan view illustrating an example optical modulator 100 according to a first embodiment. The optical modulator 100 is, for example, a Mach-Zehnder modulator formed of a material such as a GaAs-based semiconductor or an InP-based semiconductor. The optical modulator 100 includes a substrate 10, an entry port 40, exit ports 42, 44, 46, and 48, a plurality of waveguides, a plurality of couplers, and an antireflection coating 54. The waveguides are arm waveguides having a mesa structure. The couplers are multi-mode interferometer (MMI) couplers. The X-axis direction and the Y-axis direction are the directions of the sides of the substrate 10. The Z-axis direction is the direction in which semiconductor layers are stacked on top of each other. These directions are orthogonal to each other.

The substrate 10 is a semiconductor substrate formed of a compound semiconductor. The substrate 10 is rectangular and has four faces 10a to 10d. The face 10a and the face 10b extend in the Y-axis direction and are opposed to each other in the X-axis direction. The face 10c and the face 10d extend in the X-axis direction and are opposed to each other in the Y-axis direction. The faces 10a and 10b have a length of, for example, 8 to 9 mm. The faces 10c and 10d have a length of, for example, 10 to 12 mm.

The entry port 40 and the exit ports 42, 44, 46, and 48 are disposed in the face 10a. The exit ports 42 and 46 are arranged in sequence from near the entry port 40 on one side of the entry port 40 in the Y-axis direction. The exit ports 44 and 48 are arranged in sequence from near the entry port 40 on the opposite side. The antireflection coating 54 is disposed on the face 10b. The antireflection coating 54 is formed of, for example, an aluminum oxide ($Al_2O_3$) layer with a thickness of 0.22 µm. The antireflection coating 54 reduces the reflection of light in a wavelength range of 1.53 µm to 1.57 µm. Although not shown, another antireflection coating is disposed on the face 10a. In FIG. 1A, electrodes are not shown.

A plurality of waveguides, arm waveguides, and a plurality of couplers are formed on the substrate 10. Each arm waveguide includes, for example, a plurality of cladding layers and a core layer disposed between the cladding layers, as described later. Waveguides 41, 47, and 52a to 52d extend in the X-axis direction. Arm waveguides 34a and 34b extend partially in the X-axis direction and partially in the Y-axis direction.

One end of the waveguide 41 is optically coupled to the entry port 40, whereas the other end of the waveguide 41 is optically coupled to one end of a 1-input, 1-output coupler 45. One end of the waveguide 47 is optically coupled to the other end of the coupler 45, whereas the other end of the waveguide 47 is optically coupled to one end of a 1-input, 2-output coupler 49. The other end of the coupler 49 is optically coupled to the waveguides 52a and 52b via a coupler 50a and to the waveguides 52c and 52d via a coupler 50b. One end of each of the two arm waveguides 34a and 34b is optically coupled to the waveguide 52a via a coupler. The other end of the arm waveguide 34a is optically coupled to one end of a downstream coupler. Similarly, two arm waveguides are optically coupled to each of the waveguides 52b to 52d.

That is, a plurality of arm waveguides and couplers are provided downstream of the waveguides 52a to 52d. The arm waveguides 34 are partially bent and extend so as to turn from the +X direction to the −X direction. One waveguide is optically coupled to each of the exit ports 42, 44, 46, and 48.

Figure 1B:
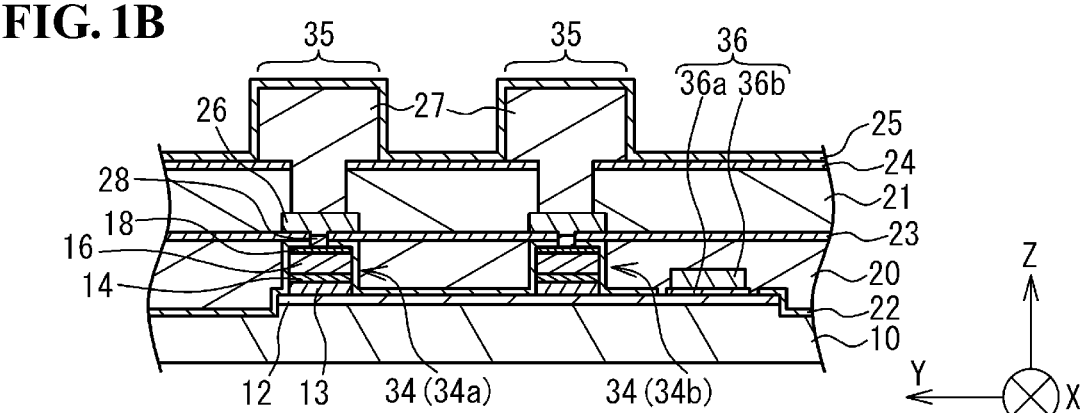
FIG. 1B is an enlarged sectional view of arm waveguides.

FIG. 1B is an enlarged sectional view of the arm waveguides 34a and 34b. A contact layer 12 (first semiconductor layer), a lower cladding layer 13, a core layer 14, an upper cladding layer 16, and a contact layer 18 (second semiconductor layer) are stacked in sequence on the substrate 10.

The substrate 10 is, for example, a semi-insulating semiconductor substrate formed of indium phosphide (InP). The contact layer 12 and the lower cladding layer 13 are formed of, for example, silicon (Si)-doped n-type InP. The contact layer 12 has a thickness of, for example, 500 nm. The lower cladding layer 13 has a thickness of, for example, 800 nm. The core layer 14 is formed of, for example, a gallium indium arsenide phosphide (GaInAsP) layer with a thickness of 500 nm that has a multiple quantum well (MQW) structure. The upper cladding layer 16 is formed of, for example, a zinc (Zn)-doped p-type InP layer with a thickness of 1,300 nm. The contact layer 18 is formed of, for example, a Zn-doped p-type InGaAs layer with a thickness of 200 nm.

The compound semiconductor layers on the substrate 10 (the contact layer 12, the lower cladding layer 13, the core layer 14, the upper cladding layer 16, and the contact layer 18) form the arm waveguides 34a and 34b. The contact layer 12 extends continuously between the arm waveguide 34a and the arm waveguide 34b and outside the arm waveguide 34b toward the −Y side. The contact layer 12 electrically connects the arm waveguides 34a and 34b together. The substrate 10 and the contact layer 12 form a mesa, and the arm waveguides 34a and 34b, which have a mesa structure, are disposed on the mesa. The two arm waveguides 34a and 34b may be collectively referred to as "arm waveguide 34".

Resin layers 20 and 21 and insulating films 22, 23, 24, and 25 are disposed over the substrate 10. The insulating film 22 covers the upper surface of the substrate 10 and the side and upper surfaces of the arm waveguides 34. The resin layer 20 is disposed on the upper surface of the insulating film 22 and has embedded therein the side surfaces of the arm waveguides 34a and 34b. The insulating film 23 is disposed on the upper surface of the resin layer 20. The resin layer 21 is disposed on the upper surface of the insulating film 23. The insulating film 24 is disposed on the upper surface of the resin layer 21. The insulating film 25 is disposed on the upper surface of the insulating film 24.

An ohmic layer 28, a plating layer 26, and a wiring layer 27 are stacked in sequence on the arm waveguides 34 and function as modulation electrodes 35 (first electrode). The ohmic layer 28 is in contact with the upper surface of the contact layer 18. The plating layer 26 is in contact with the upper surface of the ohmic layer 28. The wiring layer 27 is in contact with the upper surface of the plating layer 26.

The ohmic layer 28 includes, in sequence, for example, a platinum (Pt) layer with a thickness of 30 nm, a titanium (Ti) layer with a thickness of 50 nm, a Pt layer with a thickness of 50 nm, and a gold (Au) layer with a thickness of 200 nm. The ohmic layer 28 has a width of, for example, 1 µm. Each of the plating layer 26 and the wiring layer 27 is, for example, a metal layer (TiW/Pt/Au) including, in sequence, a titanium-tungsten (TiW) layer with a thickness of 50 nm, a Pt layer with a thickness of 50 nm, and a Au layer. The plating layer 26 has a thickness of, for example, 1 µm. The wiring layer 27 has a thickness of, for example, 4 µm. The modulation electrodes 35 are electrically connected to the contact layer 18 and upper cladding layer 16 of the arm waveguides 34a and 34b.

An electrode 36 (second electrode) is disposed on the upper surface of the contact layer 12 at a position away from the arm waveguides 34a and 34b. The electrode 36 includes, in sequence, an electrode 36a and an electrode 36b. The electrode 36a is formed of, for example, an alloy of Au, germanium (Ge), and nickel (Ni). The electrode 36a has a thickness of, for example, 200 nm. The electrode 36b includes, in sequence, for example, a Ti layer with a thickness of 50 nm, a Pt layer with a thickness of 50 nm, and a Au layer with a thickness of 900 nm. The electrode 36 is electrically connected to the contact layer 12.

The insulating film 25 covers the insulating film 24 and the wiring layer 27. The resin layers 20 and 21 are formed of, for example, benzocyclobutene (BCB) resin. The resin layer 20 has a thickness of, for example, 2.5 µm. The resin layer 21 has a thickness of, for example, 3.5 µm. The insulating film 24 is, for example, a silicon oxide ($SiO_2$) film with a thickness of 0.3 µm. The insulating films 22, 23, and 25 are, for example, silicon oxynitride (SiON) films with a thickness of 0.3 µm.

Figure 2A:
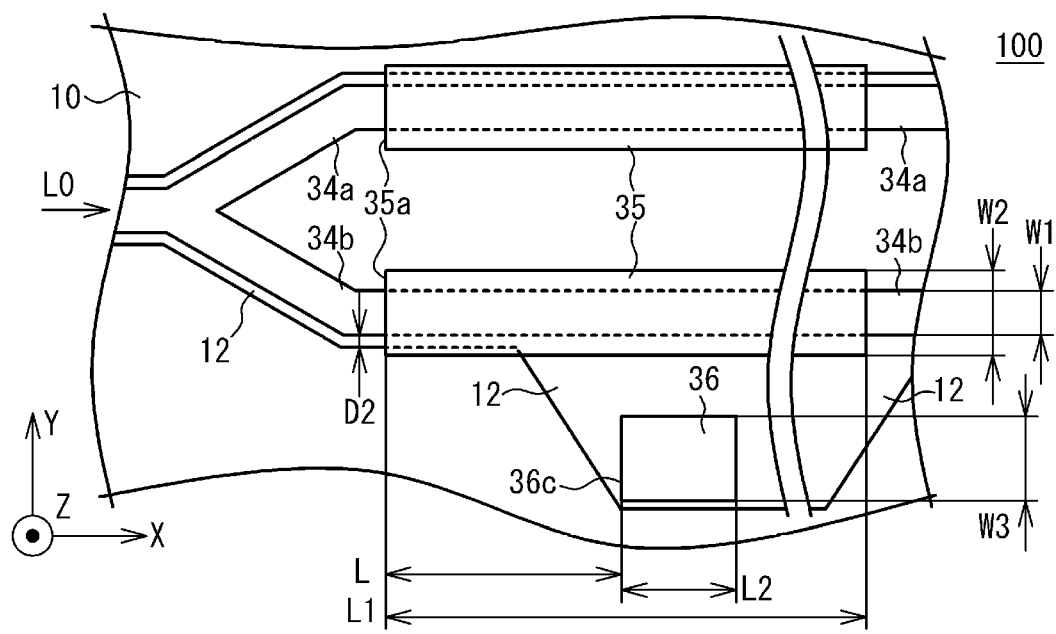
FIG. 2A is an enlarged plan view of the arm waveguides.

FIG. 2A is an enlarged plan view of the arm waveguides 34. In FIG. 2A, the couplers are omitted. As shown in FIG. 2A, the arm waveguides 34a and 34b are partially parallel to each other. In this region, the arm waveguides 34a and 34, the two modulation electrodes 35, and the electrode 36 are parallel to each other and extend in the X-axis direction. Light L0 enters the arm waveguides 34a and 34b from the −X side and propagates in the +X direction. The width W1 of the arm waveguides 34a and 34b in the Y-axis direction is, for example, 1.5 µm. The contact layer 12 extends over a larger area than the arm waveguides 34 in the XY plane. The electrode 36 is disposed on the contact layer 12 at a position away from the arm waveguides 34a and 34b.

As shown in FIG. 2A, the distance D2 from the edge of the arm waveguide 34b on the −Y side to the edge of the contact layer 12 in the Y-axis direction is, for example, 1 µm. The length L1 of the modulation electrodes 35 in the X-axis direction is, for example, 1,500 µm. The length L2 of the electrode 36 in the X-axis direction is smaller than the length L1. The width W2 of the modulation electrodes 35 is, for example, 5 µm. The width W3 of the electrode 36 is, for example, 14 µm.

The side reached earlier by light in the propagation direction of the light is referred to as "upstream", whereas the side reached later by the light is referred to as "downstream". In FIG. 2A, "upstream" refers to the −X side, whereas "downstream" refers to the +X side. The edges of the modulation electrodes 35 on the −X side (on the light L0 entry side) is referred to as "edge 35a", whereas the edge of the electrode 36 on the −X side (on the light L0 entry side) is referred to as "edge 36c". The edge 36c is located downstream of the edges 35a. The distance from the entry port 40 in FIG. 1A to the edge 36c is larger than the distance from the entry port 40 to the edges 35a.

Light entering the entry port 40 shown in FIG. 1A propagates through the waveguide 41, the coupler 45, the waveguide 47, the coupler 49, and the waveguides 52a to 52d and enters the arm waveguides 34a and 34b. The light that propagates through the arm waveguides 34a and 34b is, for example, the fundamental mode. The light that propagates through the plurality of arm waveguides 34a and 34b is split and combined by downstream couplers and exits from the exit ports 42, 44, 46, and 48.

While light is input to the arm waveguides 34a and 34b shown in FIG. 1B, for example, a direct-current reverse-bias voltage of minus several volts on which an alternating-current voltage with an amplitude of 1.5 V and a frequency of 20 GHz is superimposed is applied between the modulation electrodes 35 and the electrode 36. A radio-frequency (e.g., about 20 GHz) electrical signal flows between the modulation electrodes 35 and the electrode 36. In response to the electrical signal, the refractive index of the arm waveguides 34a and 34b changes, and accordingly the optical path length of the arm waveguides 34a and 34b changes. Thus, the phase of the light propagating through the arm waveguides 34a and 34b changes. As a result, the combined light can be modulated. Light can also be similarly modulated in other arm waveguides.

The electrode 36 is connected to the contact layer 12, which is an n-type semiconductor layer. The contact layer 12 and the lower cladding layer 13 are located under the core layer 14. The modulation electrodes 35 are connected to the contact layer 18, which is a p-type semiconductor layer. The contact layer 18 and the upper cladding layer 16 are located over the core layer 14. Thus, as a reverse-bias voltage is applied, an electric field is formed in the core layer 14 in the Z-axis direction. The core layer 14 absorbs light to generate electron-hole pairs. These carriers flow toward the +Z side or the −Z side under the action of the electric field. Thus, a current flows through the arm waveguides 34 in the Z-axis direction. An increased current density may lead to short-circuit destruction of the arm waveguides 34.

Figure 2B:
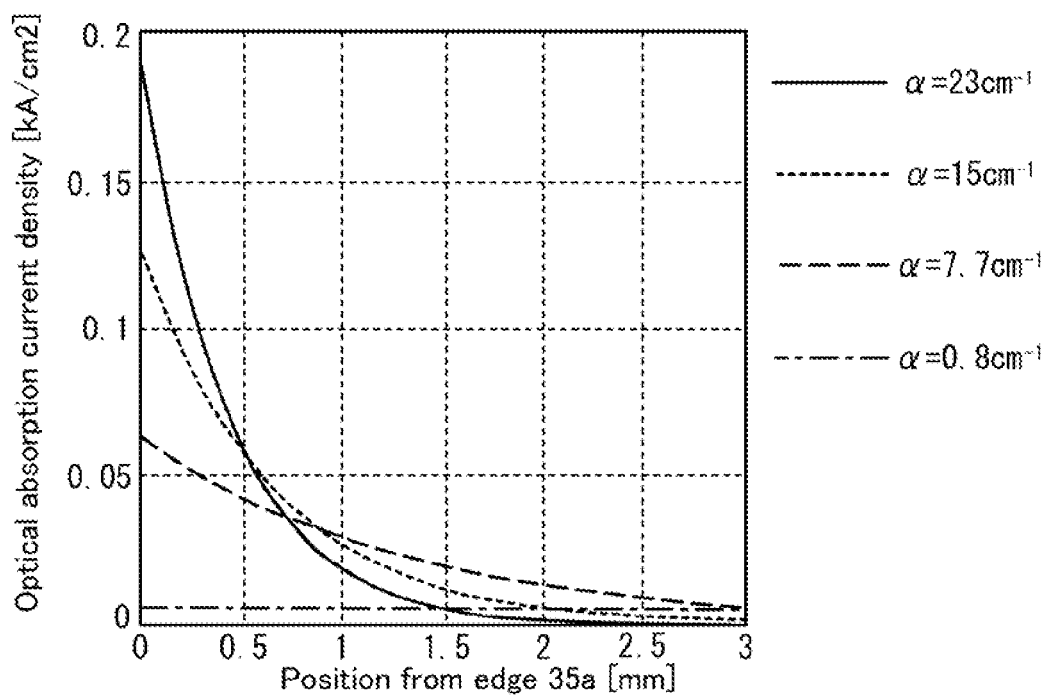
FIG. 2B is a graph showing the relationship between optical absorption current density and position.

FIG. 2B is a graph showing the relationship between optical absorption current density and position. The horizontal axis represents the position in the X-axis direction with respect to the edges 35a of the modulation electrodes 35. A larger value indicates a position farther away from the edges 35a toward the +X side. The vertical axis represents calculation results of the density of the current generated from the core layer 14 of the arm waveguides 34 by the absorption of light at 1 mW. The solid line represents an example in which the core layer 14 has an optical absorption coefficient α of 23 cm$^{-1}$. The dotted line represents an example in which the core layer 14 has an optical absorption coefficient α of 15 cm$^{-1}$. The dashed line represents an example in which the core layer 14 has an optical absorption coefficient α of 7.7 cm$^{-1}$. The one-dot chain line represents an example in which the core layer 14 has an optical absorption coefficient α of 0.8 cm$^{-1}$.

As shown in FIG. 2B, the current density is higher at a position closer to the edges 35a and is lower at a position farther away from the edges 35a. Light entering the arm waveguides 34 has a higher intensity at a position closer to the entry positions of the arm waveguides 34 and attenuates while propagating. A higher light intensity results in a higher current generated from the core layer 14, whereas a lower light intensity results in a lower current. The light intensity is higher at the edges 35a of the modulation electrodes 35 because the edges 35a are closer to the entry positions of the arm waveguides 34. Thus, as shown in FIG. 2B, the current density is higher at a position closer to the edges 35a and is lower at a position farther away from the edges 35a.

The application of a higher voltage and the entry of more intense light increase the current and may thus destroy the core layer 14. For example, if the intensity of light entering the arm waveguides 34 is 4 dBm or more, the current density exceeds 1 kA near the edges 35a, thus leading to destruction. The current causes the arm waveguides 34 to generate heat. Because of the heat generation, the core layer 14 absorbs light more easily, which increases the current and thus results in more heat generation. Such positive feedback increases the likelihood of destruction. If the core layer 14 is destroyed, the rectification characteristics of the p-n junctions of the arm waveguides 34 disappear, thus leading to short-circuit. As a result, a large current flows when a reverse voltage is applied, which makes it difficult to modulate light.

To prevent destruction, for example, the voltage applied to the modulation electrodes 35 may be decreased. However, for example, a reverse voltage of 10 V or more is applied to modulate light. Thus, it is difficult to decrease the voltage. On the other hand, the light intensity may be decreased to reduce the current density and thereby prevent destruction. However, a larger number of amplifiers would be used to amplify optical signals for use in optical communication, thus increasing the device size. Thus, it is also difficult to decrease the light intensity.

According to the first embodiment, as shown in FIG. 2A, the edge 36c of the electrode 36 is located downstream of the edges 35a of the modulation electrodes 35 in the propagation direction of light. A current generated from the core layer 14 flows through the contact layer 12 to reach the edge 36c of the electrode 36. A voltage drop occurs within the contact layer 12 in the X-axis direction due to the resistive component of the contact layer 12 and the current. The potential of the contact layer 12 at the edge 36c is equal to the potential applied to the electrode 36, for example, the ground potential (0 V). Because of the voltage drop, the potential of the contact layer 12 in the region on the −X-axis side with respect to the edge 36c decreases from the edge 36c in the −X-axis direction. On the other hand, the potential of the contact layer 18 of the arm waveguides 34, including the positions at the edges 35a where the modulation electrodes 35 is in contact with the arm waveguides 34, is equal to the reverse voltage applied to the modulation electrodes 35, for example, −10 V. The voltage applied to the core layer 14 of the arm waveguides 34 is proportional to the difference between the potential of the contact layer 12 and the potential of the contact layer 18. The voltage drop in the contact layer 12 decreases the voltage applied to the core layer 14 of the arm waveguides 34. In particular, the voltage applied to the core layer 14 of the arm waveguides 34 can be decreased near the edges 35a, where the light intensity is higher. Thus, the destruction of the arm waveguides 34 can be inhibited.

The voltage drop is expressed by the following equation:

$$V = \eta \frac{\lambda}{1260} \int_0^L R(x)\left(-\frac{dP}{dx}\right)dx$$
$$= \eta \frac{\lambda}{1260} \frac{Rs \cdot P0}{W4}\left(L + \frac{\exp(-L\alpha) - 1}{\alpha}\right)$$

where R is the electrical resistance of the contact layer 12, Rs is the sheet resistance of the contact layer 12, L is the length between the edges 35a and the edge 36c, $\eta\lambda(-dP/dx)/1{,}260$ is the current generated by optical absorption, W4 is the width of the contact layer 12 in the Y-axis direction, $\alpha$ is the absorption coefficient, $\eta$ is the quantum efficiency, $\lambda$ is the wavelength of light entering the arm waveguides 34, and P0 is the intensity of the light.

If $\lambda=1{,}550$ nm, P0=10 mW, $\eta=1$, Rs=30 Ω/sq, $\alpha=4$ cm$^{-1}$, W4=25 μm, and L=750 the voltage drop is about 1.5 V. To inhibit destruction, a voltage drop of 1 V or more is preferred, and an edge-to-edge distance L of 350 μm or more is preferred.

According to the first embodiment, the destruction of the core layer 14 is inhibited by the voltage drop. Thus, it is not necessary to decrease the intensity of light entering the arm waveguides 34 or to increase the number of amplifiers. The voltage may be set to a level sufficient for modulation.

The arm waveguides 34 include the n-type contact layer 12 and lower cladding layer 13, the core layer 14, and the p-type upper cladding layer 16 and contact layer 18, which form a p-n junction. As shown in FIGS. 1B and 2A, the contact layer 12 extends continuously under and between the arm waveguides 34a and 34b and outside the arm waveguide 34b (toward the −Y side). The electrode 36 is disposed on the contact layer 12. Because a current flows through the contact layer 12 until reaching the edge 36c of the electrode 36, a voltage drop occurs, thus inhibiting the destruction of the core layer 14. As a result, the destruction of the p-n junctions of the arm waveguides 34 is inhibited, and their rectification characteristics are maintained.

The contact layer 12 includes n-InP. The upper cladding layer 16 includes p-InP. The core layer 14 includes AlGaInAs. Destruction is inhibited, and the p-n junction therebetween is protected. The arm waveguides 34 may be formed of other compound semiconductors.

Second Embodiment

Figure 3A:
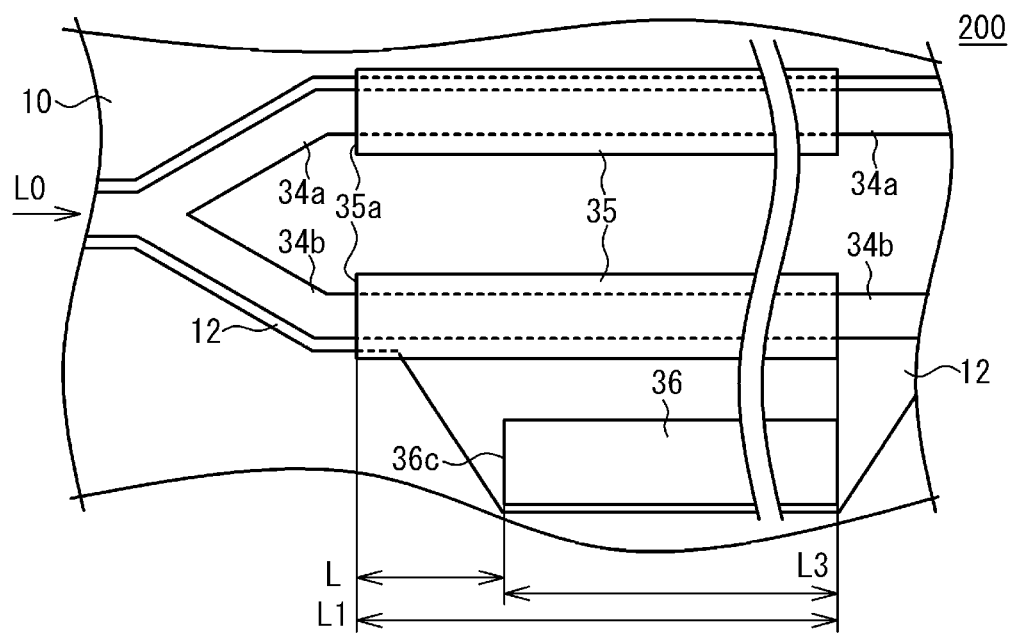
FIG. 3A is a plan view illustrating an example optical modulator according to a second embodiment.

In a second embodiment, the electrostatic discharge (ESD) breakdown voltage is improved. FIG. 3A is a plan view illustrating an example optical modulator 200 according to the second embodiment. A description of the same components as in the first embodiment is omitted. As shown in FIG. 3A, the length of the electrode 36 is L3. The length L3 is increased to alleviate the concentration of an electric field at the electrode 36, thereby inhibiting electrostatic destruction.

Figure 3B:
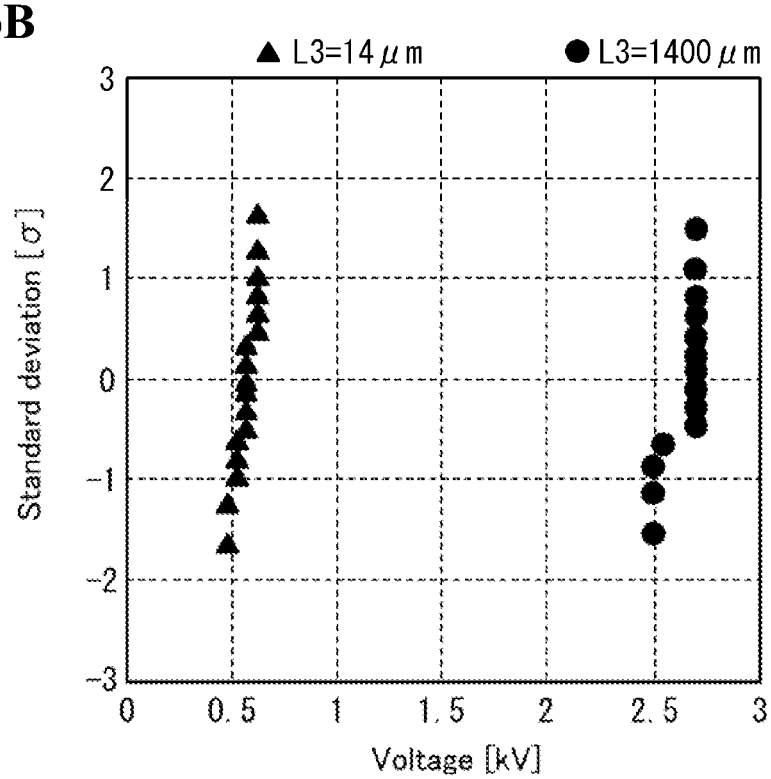
FIG. 3B is a graph showing the results of breakdown voltage evaluation.

The voltage at which the optical modulator 200 was destroyed when a pulsed voltage was applied was investigated, with the length L1 of the modulation electrodes 35 being 1,500 μm and the length L3 of the electrode 36 being 14 μm or 1,400 μm. FIG. 3B is a graph showing the results of the breakdown voltage evaluation. The horizontal axis represents the pulsed voltage, whereas the vertical axis represents the multiple of a standard deviation concerning destruction (the probability expected from a normal distribution). The triangles represent examples in which L3=14 μm. The circles examples in which L3=1,400 μm. As shown in FIG. 3B, in the example in which L3=14 μm, the optical modulator is destroyed at a voltage of about 500 V. This is because the electric field generated from the modulation electrodes 35 concentrates at the electrode 36. On the other hand, in the example in which L3=1,400 μm, the optical modulator is destroyed at 2,500 V.

According to the second embodiment, the length L3 of the electrode 36 in the X-axis direction is increased to alleviate the concentration of an electric field at the electrode 36 so that the electric field is uniformly distributed over the electrode 36. Thus, the breakdown voltage can be improved, thereby inhibiting destruction. In particular, the length L3 of the electrode 36 is preferably 200 μm or more. For example, the length L3 is preferably equal to the length L1 of the modulation electrodes 35, or 20% or more of the length L1. When the optical modulator 200 is assembled into a package, an electrostatic voltage of several hundreds of volts may be applied thereto. The increased breakdown voltage can inhibit electrostatic destruction. Because the edge 36c is located downstream of the edges 35a, as in the first embodiment, destruction due to current can be inhibited.

Although certain embodiments of the present disclosure have been described in detail above, the disclosure is not limited to these embodiments. Rather, various changes and modifications can be made within the spirit of the disclosure as set forth in the claims.

What is claimed is:

1. An optical modulator comprising:
   a waveguide comprising a semiconductor and configured to allow light to propagate therethrough;
   a first electrode disposed on the waveguide and electrically connected to the waveguide; and
   a second electrode separated from the waveguide and electrically connected to the waveguide,
   wherein an edge of the second electrode on a light entry side is located downstream of an edge of the first electrode on the light entry side in a propagation direction of the light,
   wherein the second electrode and the waveguide are located in a first resin layer.

2. The optical modulator according to claim 1, wherein the waveguide includes a first semiconductor layer of a first conductivity type, a first cladding layer, a core layer disposed on the first cladding layer, a second semiconductor layer of a second conductivity type, and a second cladding layer disposed between the second semiconductor layer and the core layer, the first semiconductor layer extends outside the waveguide, the first electrode is electrically connected to the second semiconductor layer, and the second electrode is disposed on the first semiconductor layer and is electrically connected to the first semiconductor layer.

3. The optical modulator according to claim 2, wherein the first semiconductor layer and the second semiconductor layer include indium phosphide, and the core layer includes aluminum gallium indium arsenide.

4. The optical modulator according to claim 1, wherein a distance from the edge of the first electrode to the edge of the second electrode in the propagation direction of the light is 350 μm or more.

5. The optical modulator according to claim 1, wherein the first electrode and the second electrode extend in the propagation direction of the light, and the second electrode has a length of 200 μm or more in the propagation direction of the light.

6. An optical modulator comprising:

a waveguide comprising a semiconductor and configured to allow light to propagate therethrough;

a first electrode disposed on the waveguide and electrically connected to the waveguide; and a second electrode separated from the waveguide and electrically connected to the waveguide, wherein an edge of the second electrode on a light entry side is located downstream of an edge of the first electrode on the light entry side in a propagation direction of the light, wherein a first insulating film covers a portion of a top of an upper surface of the waveguide, and wherein a second insulating film is in contact with the first insulating film on the upper surface of the waveguide.

7. The optical modulator according to claim 6, wherein the waveguide includes a first semiconductor layer of a first conductivity type, a first cladding layer, a core layer disposed on the first cladding layer, a second semiconductor layer of a second conductivity type, and a second cladding layer disposed between the second semiconductor layer and the core layer, the first semiconductor layer extends outside the waveguide, the first electrode is electrically connected to the second semiconductor layer, and the second electrode is disposed on the first semiconductor layer and is electrically connected to the first semiconductor layer.

8. The optical modulator according to claim 7, wherein the first semiconductor layer and the second semiconductor layer include indium phosphide, and the core layer includes aluminum gallium indium arsenide.

9. The optical modulator according to claim 6, wherein a distance from the edge of the first electrode to the edge of the second electrode in the propagation direction of the light is 350 μm or more.

10. The optical modulator according to claim 6, wherein the first electrode and the second electrode extend in the propagation direction of the light, and the second electrode has a length of 200 μm or more in the propagation direction of the light.

11. An optical modulator comprising:

a waveguide comprising a semiconductor and configured to allow light to propagate therethrough;

a first electrode disposed on the waveguide and electrically connected to the waveguide; and a second electrode separated from the waveguide and electrically connected to the waveguide, wherein an edge of the second electrode on a light entry side is located downstream of an edge of the first electrode on the light entry side in a propagation direction of the light, the waveguide includes a first semiconductor layer of a first conductivity type, a first cladding layer, a core layer disposed on the first cladding layer, a second semiconductor layer of a second conductivity type, and a second cladding layer disposed between the second semiconductor layer and the core layer, the first electrode is in contact with an upper surface of the second semiconductor layer, and extends from the edge thereof toward downstream in the propagation direction of the light, the second electrode is in contact with an upper surface of the first semiconductor layer, and extends from the edge thereof toward downstream in the propagation direction of the light, and a length along the propagation direction of the light of the first electrode, and a length along the propagation direction of the light of the second electrode are shorter than a length along the propagation direction of the light of the waveguide.

12. The optical modulator according to claim 11, wherein the first semiconductor layer and the second semiconductor layer include indium phosphide, and the core layer includes aluminum gallium indium arsenide.

13. The optical modulator according to claim 11, wherein a distance from the edge of the first electrode to the edge of the second electrode in the propagation direction of the light is 350 μm or more.

14. The optical modulator according to claim 11, wherein the first electrode and the second electrode extend in the propagation direction of the light, and the second electrode has a length of 200 μm or more in the propagation direction of the light.

\* \* \* \* \*